(12) United States Patent
Lin

(10) Patent No.: US 6,778,261 B2
(45) Date of Patent: Aug. 17, 2004

(54) FILM FIXING INSTRUMENT

(75) Inventor: Joe Lin, Taipei (TW)

(73) Assignee: Benq Corporation, Taoyuan (TW)

( * ) Notice: Subject to any disclaimer, the term of this patent is extended or adjusted under 35 U.S.C. 154(b) by 36 days.

(21) Appl. No.: 10/035,155

(22) Filed: Jan. 4, 2002

(65) Prior Publication Data

US 2002/0096547 A1 Jul. 25, 2002

(30) Foreign Application Priority Data

Jan. 5, 2001 (TW) .................................. 90200246 U

(51) Int. Cl.⁷ ...................... G03B 27/62; G03B 27/52; G03B 27/00
(52) U.S. Cl. .............. 355/75; 355/40; 355/18
(58) Field of Search ............... 355/75, 72, 41, 355/40, 50, 20, 67, 18

(56) References Cited

U.S. PATENT DOCUMENTS 4,786,944 A * 11/1988 Sakamoto et al. ............. 355/20
5,515,138 A * 5/1996 Hasegawa et al. ............. 355/67
6,151,104 A * 11/2000 Oku ............................. 355/75

* cited by examiner

*Primary Examiner*—Peter B Kim
(74) *Attorney, Agent, or Firm*—Rabin & Berdo, P.C.

(57) ABSTRACT

A film fixing instrument for fixing films of different scales comprises: a loader for loading said films and comprising a loader window, said loader comprising a plurality of couplers on the sides of said loader window; an adjuster for adjusting said loader window, said adjuster comprising a plurality of fixers coupled with said a plurality of couplers, said loader selectively installed on said loader; a film clip for securing said films on said film fixing instrument. The films of different scales can be fixed on said film fixing instrument by adjusting the coupling method between said adjuster and said loader.

10 Claims, 10 Drawing Sheets

FILM FIXING INSTRUMENT

This application incorporates by reference Taiwanese application Serial No. 90200246, Filed Jan. 05, 2001.

BACKGROUND OF THE INVENTION

1. Field of the Invention

This invention relates to a film fixing instrument, particularly to the film fixing instrument capable of fixing films of different scales.

2. Description of the Related Art

The technologies of the computer and the instruments related to the computer have been greatly advanced. For example, consider the scanner. The resolution and the realistic degree of the image have been greatly improved because of the advancements in the imaging tool and method. Nowadays, we can obtain film data of digital type by scanning the film with a scanner, and storing the image data in the computer. The user can obtain images of better quality, from digital image data with finer and more realistic color. To illustrate the image processes, the traditional methods of scanning and film fixing are briefly described below, and shown in FIGS. 1 and 2.

Referring to FIG. 1, it shows the traditional method by which the film is scanned by the scanner 100. The film 102 to be scanned is put on the transparent plate 108, and the transparent plate 108 is covered by the upper plate 104 to block the light from the outside. While scanning, the light source 106 on the upper plate 104 emits light. The light passes the film 102 to the reflector 110, then through the lens 112, and arrives at the image processor 114. After the image processor 114 completes processing the image, the image data "data_out" is the resulting output.

Referring to FIG. 2, it shows the film fixing instrument 200 according to the traditional method. A film 102 is fixed on the transparent plate 108, properly positioned by the film fixing instrument 200. The film fixing instrument acts to prevent the film 102 from sliding on the transparent plate 108, and to prevent additional loss in the quality of the scanning result. Traditionally, the film fixing instrument 200 comprises a loader 204 to load the film 102 and a film clip 206 to secure the film 102 on the transparent plate 108. There are windows centered both on the loader 204 and on the film clip 206, so that the light from the light source 106 on the upper plate 104 could pass through the window on the film clip 206, the film 102, and the window on the loader 204, and arrive at the scanner.

However, for the versatility of the traditional film fixing instrument is limited by the size of the film it can support. Depending on the variable sizes of the film to be scanned, the loader and the film clip also have to be designed for the different sizes. Thus, the user must prepare several film fixing instruments of different sizes to facilitate the scanning process for films of diverse sizes, which can increase the cost for the user.

SUMMARY OF THE INVENTION

The object of the present invention is to provide a film fixing instrument capable of fixing films of different scales using the same film fixing instrument, and thereby, lower the cost for the user.

The film fixing instrument for fixing films with different scales comprises a loader for loading the film, an adjuster for adjusting the loader window, and a film clip for securing the film on the film fixing instrument. Both the clip and the loader have windows, and the loader window comprises a plurality of couplers that are coupled with a plurality of fixers on the adjuster. Films of different scales are fixed on the film fixing instrument by adjusting the shape of the adjuster and the coupling method of the fixer on the adjuster and the couplers on the loader.

BRIEF DESCRIPTION OF THE DRAWINGS

The above objects and other advantages of the present invention will become more apparent from the detailed description of the preferred embodiments of the present invention with reference to the attached drawings in which.

DESCRIPTION OF THE PREFERRED EMBODIMENTS

The present invention discloses a film fixing instrument wherein an adjuster is applied on the instrument by coupling the adjuster and the loader. Various loader windows can be achieved, and therefore, films of different scales can be fixed on the film fixing instrument by adjusting the shape of the adjuster and the coupling method of the adjuster and the loader.

The First Embodiment

Figure 3:
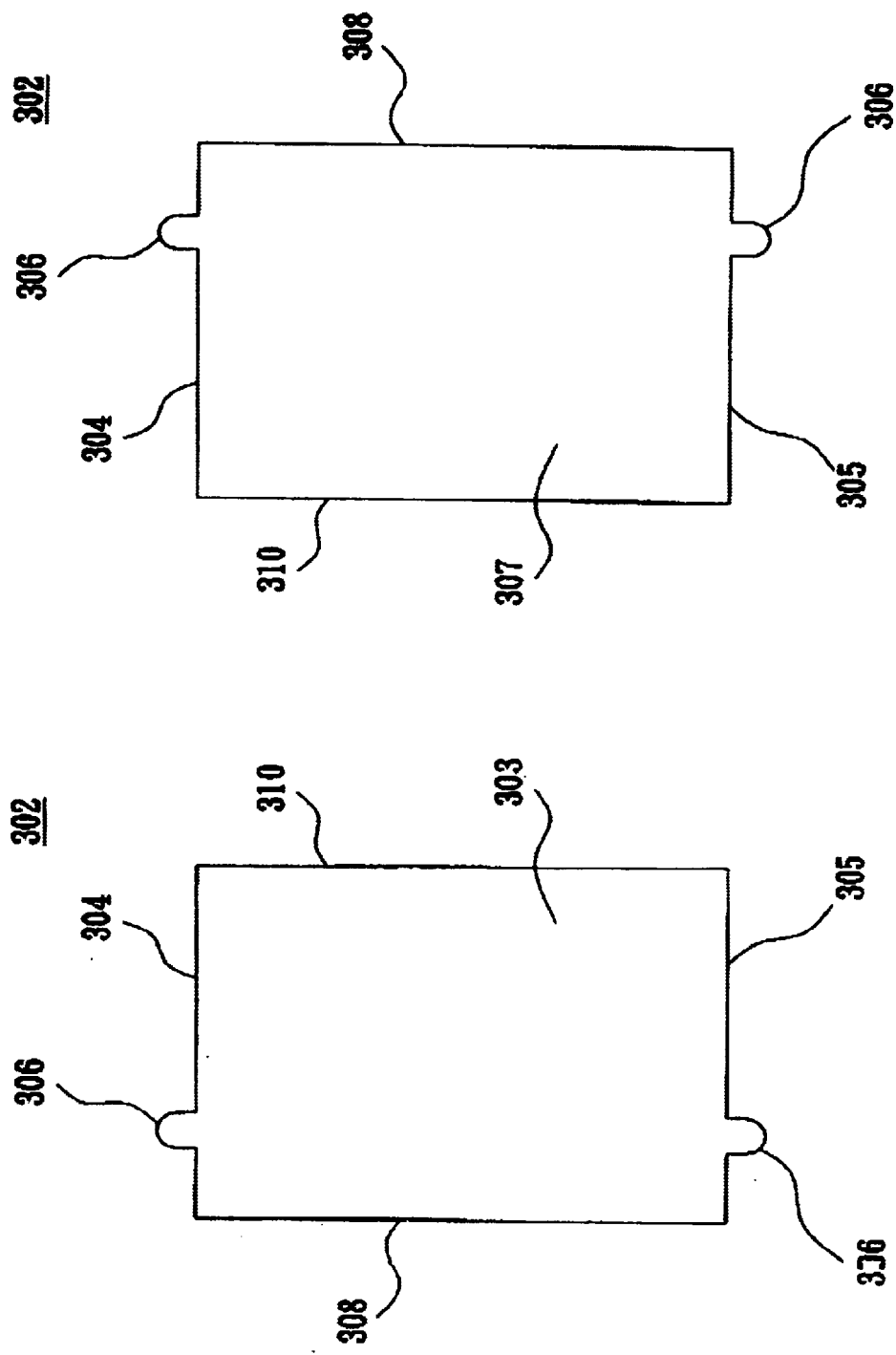
FIG. 3A shows the top view of the adjuster with the front upward, according to the first embodiment of the present invention.
FIG. 3B shows the top view of the adjuster with the rear upward, according to the first embodiment of the present invention.

Referring to FIG. 3A, it shows the top view of the adjuster 302 with the front 303 upward, according to the first embodiment of the present invention. The adjuster 302 is rectangular, and comprises two fixers 306, on the upper edge 304 and lower edge 305, respectively. The fixer 306, for instance, is a protrusion. The position of the fixers 306 are not centered on the upper edge 304 nor on the lower edge 305, but are shifted to one side of the upper edge 304 and the lower edge 305. As shown in FIG. 3A, the fixers 306 on the upper edge 304 and the lower edge 305 are both closer to the first edge 308 than to the second edge 310. Therefore, while the adjuster 302 of the FIG. 3A is turned over and the bottom surface 307 of the adjuster 302 is upward, as shown in FIG. 3B, the fixers 306 of the adjuster 302 are positioned on the other side compared to those in the FIG. 3A.

Figure 4:
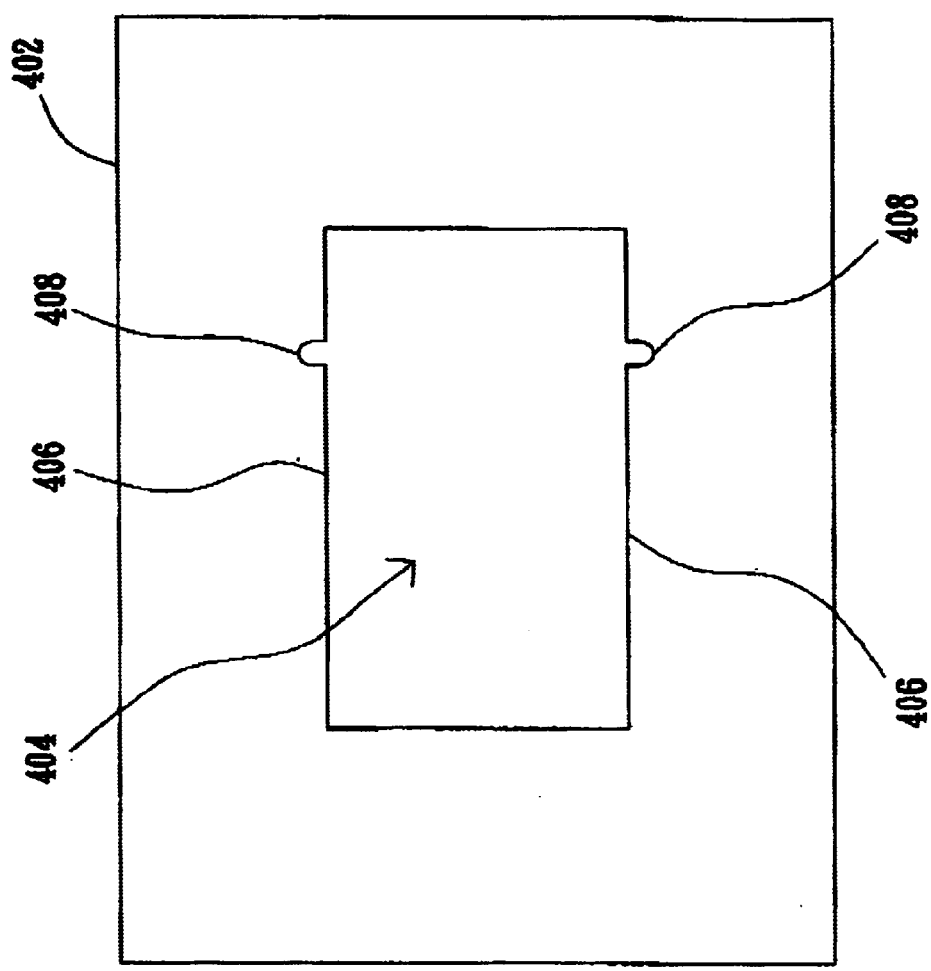
FIG. 4 shows the top view of the loader, according to the first embodiment of the present invention.

Referring to FIG. 4, it shows the top view of the loader 402, according to the first embodiment of the present invention. There are two couplers 408 on the two sides 406 of the loader window 404. The coupler 408, for instance, is a recess. The fixers 306 on the adjuster 302 are coupled with the couplers 408 on the loader 402.

Figure 5A:
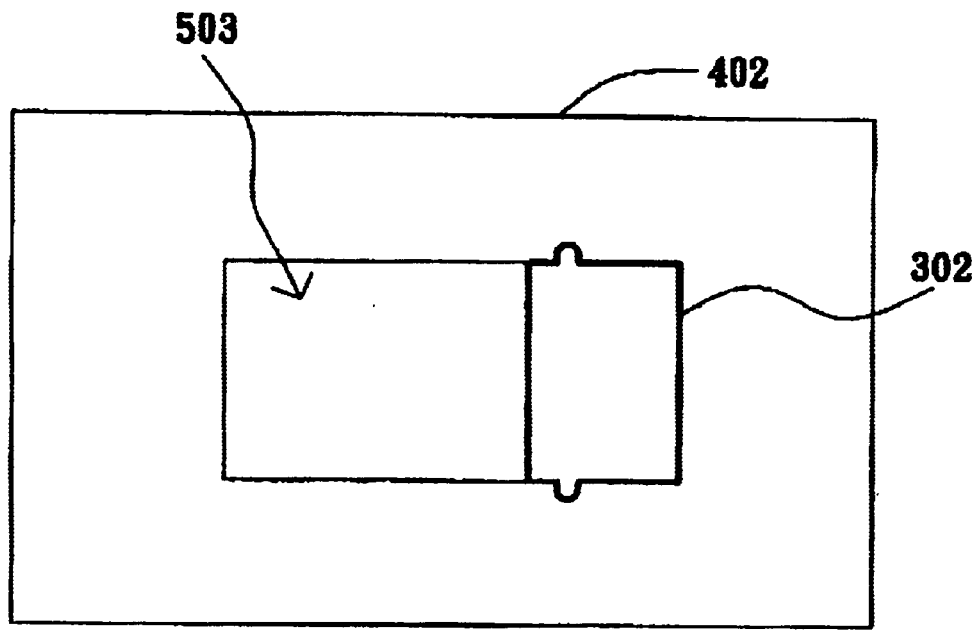
FIG. 5A shows the top view of the coupling relation between the adjuster and the loader, according to the first embodiment of the present invention.

Next, referring to FIG. 5A, it shows the top view of the coupling relation between the adjuster 302 and the loader 402, according to the first embodiment of the present invention. The user can adjust the loader window 404 (shown in FIG. 4) by selecting the coupling method between the adjuster 302 and the loader 402. In this example, the loader window 503 (shown in FIG. 5A) is smaller than the loader window 404 without the adjuster 302 (shown in FIG. 4), while the adjuster 302 with the front 303 upward is coupled with the loader 402. Then, as shown from the top view in FIG. 5B, the film of the first scale 501 is fixed on the film fixing instrument 500 using the film clip 502.

Figure 6A:
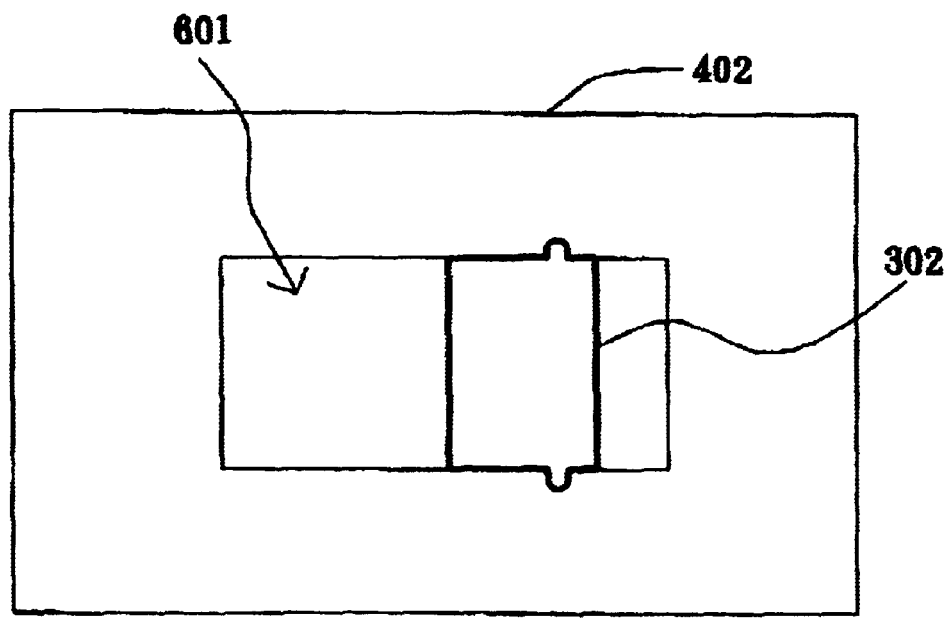
FIG. 6A illustrates the top view of another coupling relation between the adjuster and the loader, according to the first embodiment of the present invention.

Referring to FIG. 6A, it shows the top view of the coupling relation between the adjuster 302 and the loader 402, according to the first embodiment of the present invention. While the user turns over the adjuster 302 in the FIG. 5A, the adjuster 302 with the bottom 307 upward is coupled with the loader 402, as shown in the FIG. 6A. The loader window 601 is not only smaller than the loader window 404 without the adjuster 302 (shown in FIG. 4), but is also smaller than the loader window 503 with the adjuster 302 of the front 303 upward (shown in FIG. 5A). As shown from the top view in FIG. 6B, the film of the second scale 603 is fixed on the film fixing instrument 602 using the film clip 604.

Figure 1:
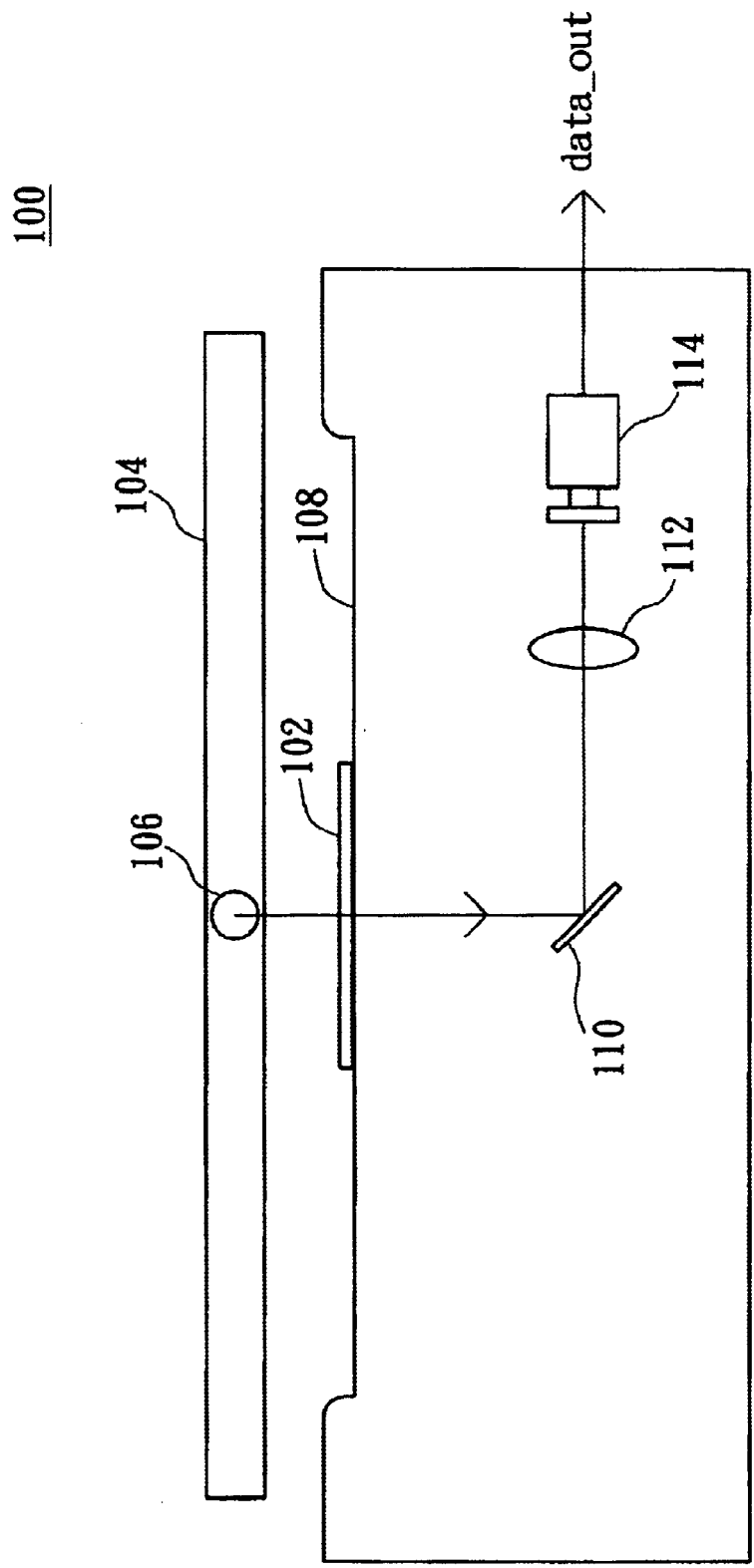
FIG. 1 shows the traditional method by which the film is scanned by the scanner, as described above.
Figure 2:
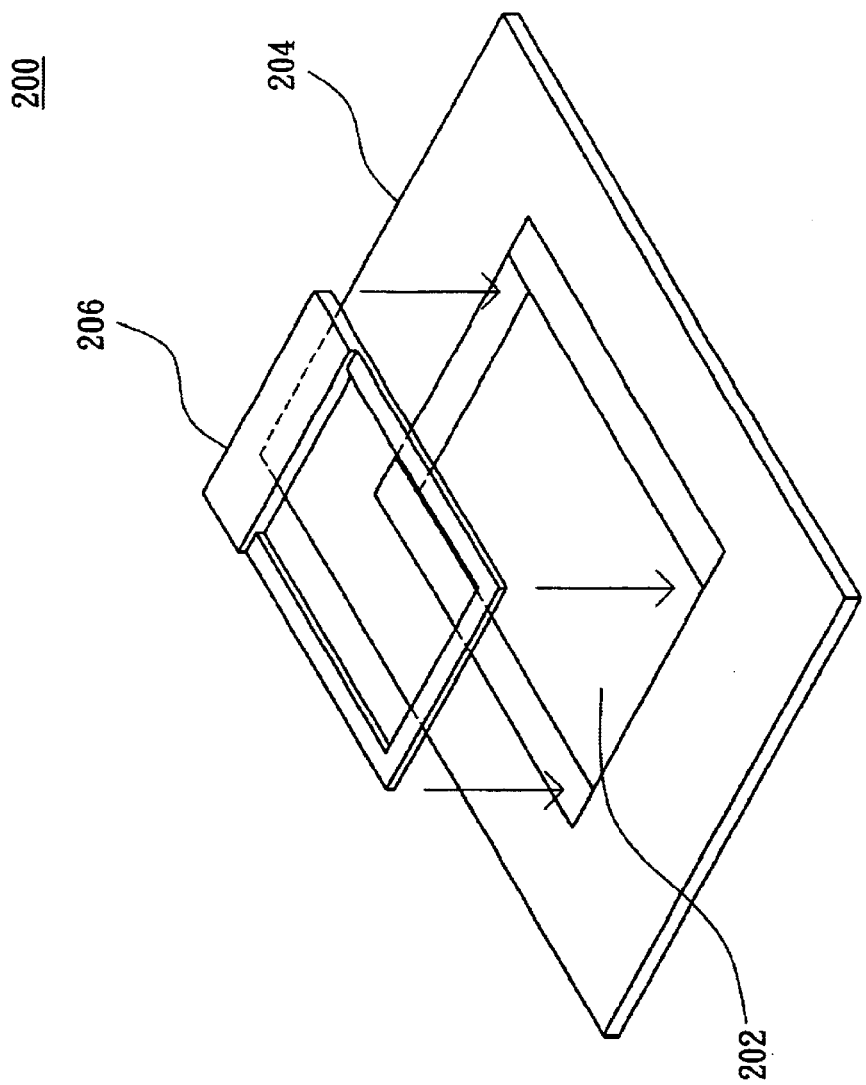
FIG. 2 shows the film fixing instrument according to the traditional method.

Comparing the films of the first scale 501 (shown in FIG. 5B), the second scale 603 (shown in FIG. 6B), and the third scale 202 (shown in FIG. 2) by the traditional film fixing instrument 200, the sequence of the films in decreasing size is the film of the third scale 202, the film of the first scale 501, and the film of the second scale 603. According to the invention, three film scales can be fixed using on the fixing instrument, using the adjuster 302 or the coupling relation between the adjuster 302 and the loader 402, as illustrated in the following examples.

Figure 5B:
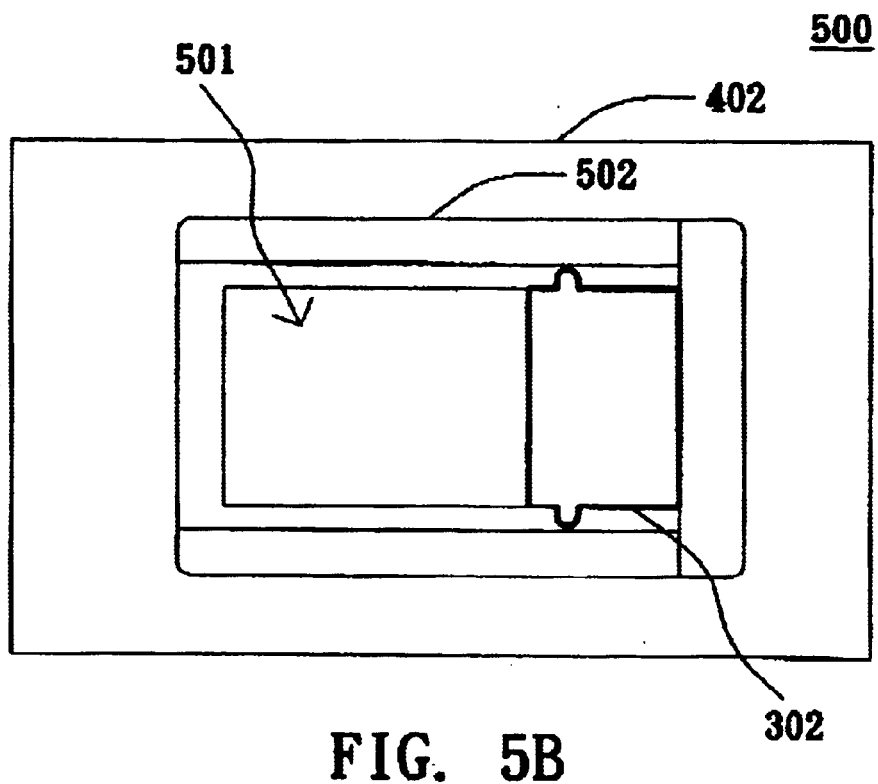
FIG. 5B shows the top view of the film fixing instrument, according to the first embodiment of the present invention.
Figure 6B:
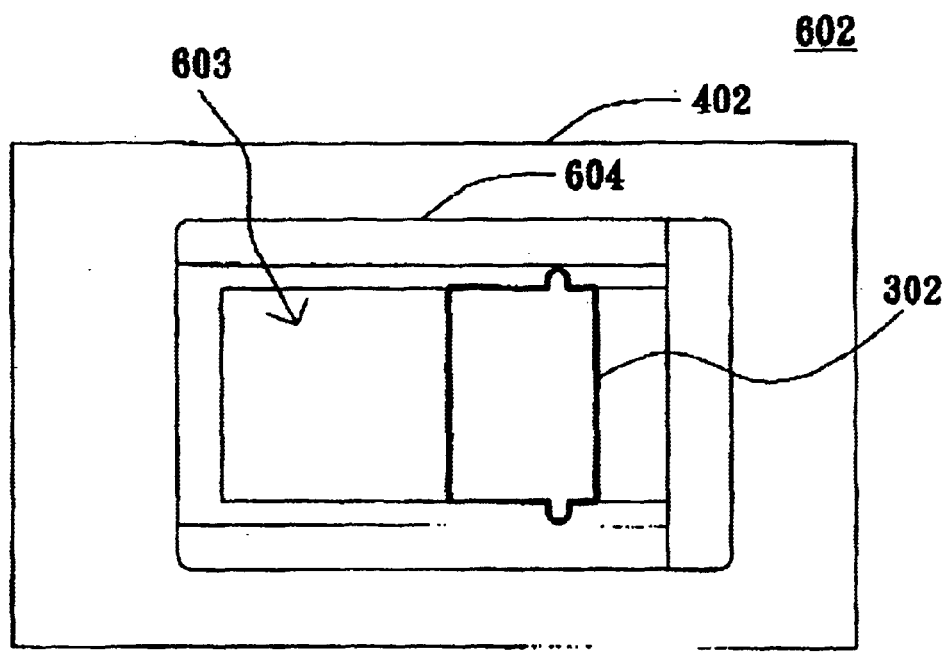
FIG. 6B illustrates another top view of the film fixing instrument, according to the first embodiment of the present invention.

As an example, the loader window 404 is sized at 6 cm by 9 cm and the adjuster is sized at 6 cm by 2 cm. For the adjuster 302 with the front 303 upward, shown in FIG. 3A, the fixer 306 on the upper edge 304 is nearer to the first edge 308, for instance at 0.5 cm, than to the second edge 310, for instance at 1.5 cm. In FIG. 4, the coupler 408 of the loader 402 to the right edge of the loader window 404 is 1.5 cm. Therefore, there are three ways of coupling. Firstly, a film sized at 6 cm by 9 cm could be fixed on the film fixing instrument 200 without the adjuster 302, as in FIG. 2. Secondly, as shown in FIG. 5B, a film sized at 6 cm by 7 cm could be fixed on the film fixing instrument 500 while the adjuster 302 is coupled with the loader 402 according to the method in FIG. 5A. As shown in FIG. 6B, a film sized at 6 cm by 6 cm could be fixed on the film fixing instrument 602 while the adjuster 302 is coupled with the loader 402 according to the method in FIG. 6A. Consequently, films of the three sizes (6 cm by 9 cm, 6 cm by 7 cm, and 6 cm by 6 cm) can be all used on the scanner by the same film fixing instrument.

The Second Embodiment

Figure 7:
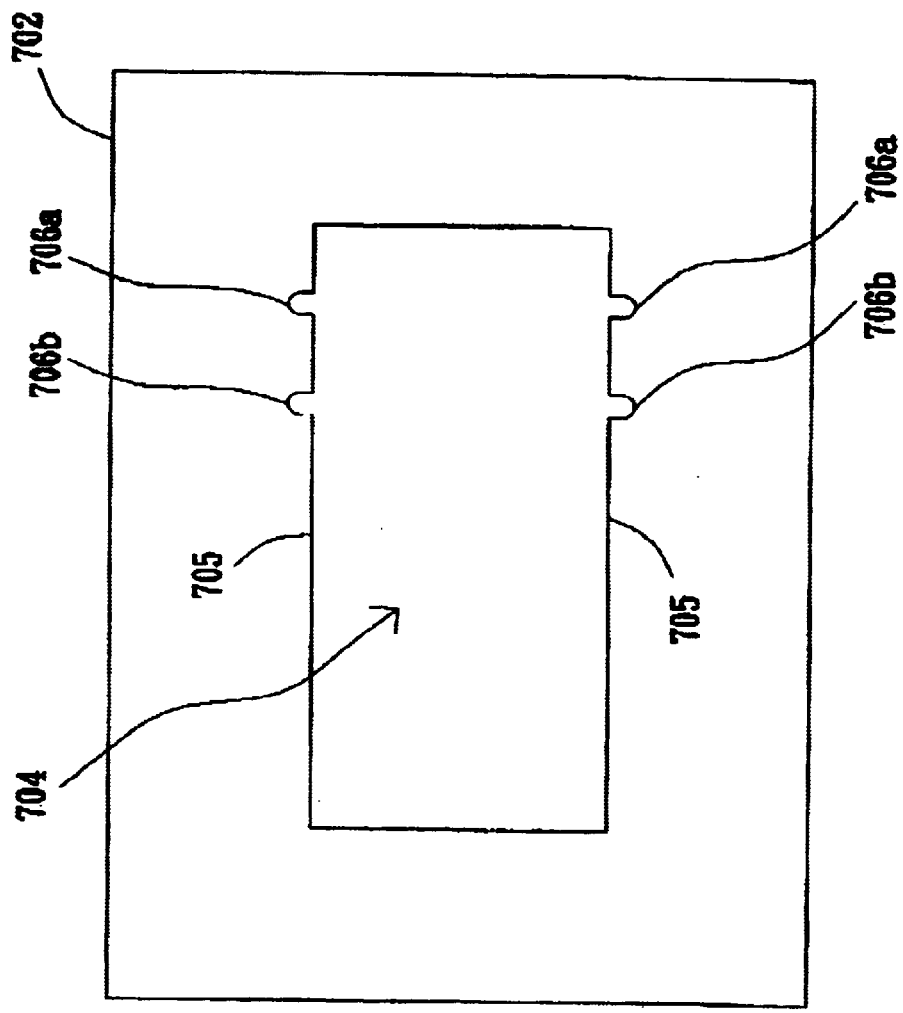
FIG. 7 shows the top view of the loader, according to the second embodiment of the present invention.
Figure 8A:
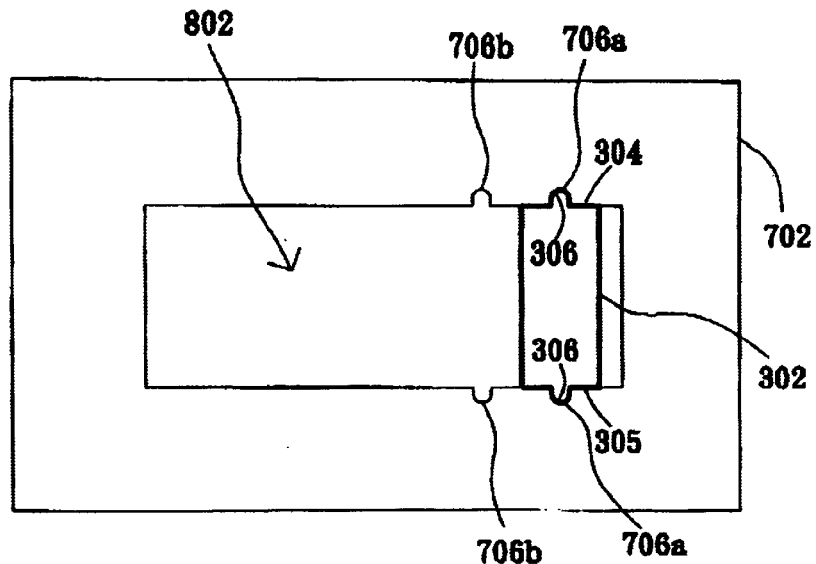
FIG. 8A shows the top view of the coupling relation between the adjuster and the loader, according to the second embodiment of the present invention.
Figure 8B:
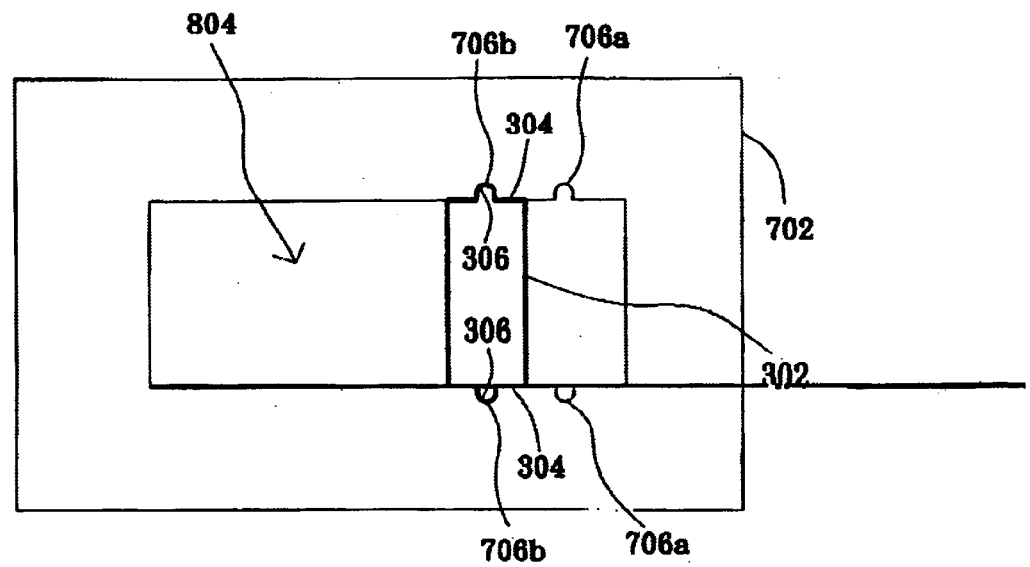
FIG. 8B illustrates the top view of another coupling relation between the adjuster and the loader, according to the second embodiment of the present invention.

Referring to FIG. 7, it shows the top view loader 702 according to the second embodiment of the present invention. In this embodiment, the couplers 706a, 706b are positioned every proper distance on the two sides 705 of the loader window 704. As shown in FIG. 7, the couplers comprise the first coupler 706a and the second coupler 706b. Referring to FIGS. 8A and 8B simultaneously, they show the top view of the coupling relation between the adjuster 302 and the loader 702, according to the second embodiment of the present invention, wherein the fixers 306 are centered on the edges 304 and 305 of the adjuster 302. Firstly, the film of the third scale 202 (shown in FIG. 2) is fixed while the adjuster 302 is not on the loader 702 (as shown in FIG. 7). Secondly, while the fixers 306 of the adjuster 302 are coupled with the first coupler 706a, the film of the first scale 501 is fixed on the film fixing instrument, as show in FIG. 8A. Finally, as shown in FIG. 8B, the film of the second scale 603 is fixed on the film fixing instrument, while the fixers 306 of the adjuster 302 are coupled with the second coupler 706b. Therefore, the user could fix films of different sizes on the film fixing instrument by changing different parts of the couplers 706 of the loader 702 to couple with the adjuster 302. The couplers 706a, 706b on the loader 702 are not limited to two on the side 705. The number of the couplers 706a, 706b on the side 705 could be increased such that films of various scales could be fixed on the film fixing instrument.

The Third Embodiment

Figure 9A:
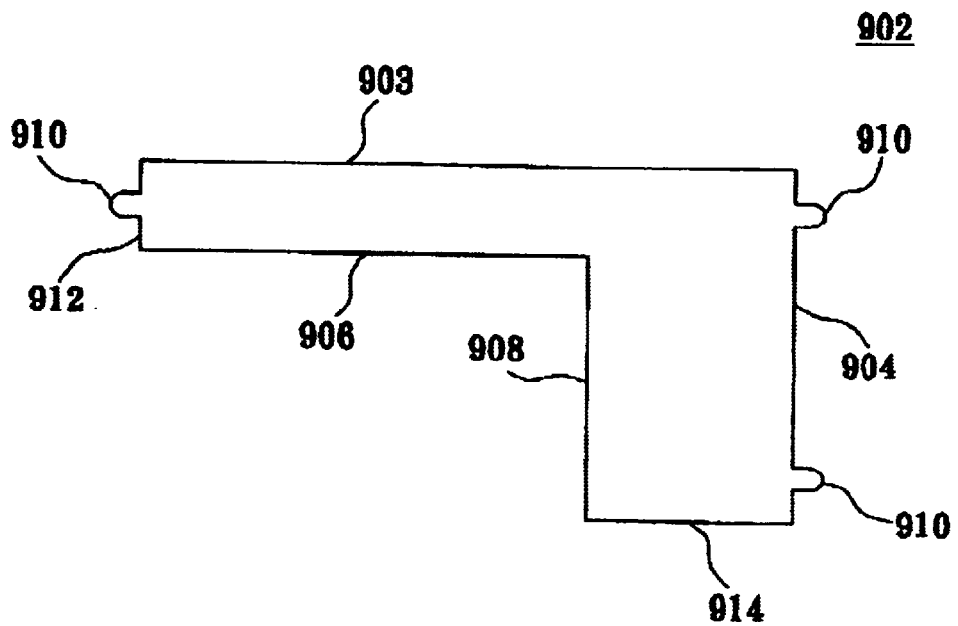
FIG. 9A shows the top view of the adjuster, according to the third embodiment of the present invention.

Besides the films of different scales in one dimension, the films with different scales in both two dimensions could be also fixed on the film fixing instrument by changing the shape of the adjuster. Referring to FIG. 9A, it shows the top view of the adjuster 902 according to the third embodiment of the present invention. The adjuster 902, a L-type structure comprises a first outer edge 903, a second outer edge 904, a first inner edge 906, a second inner edge 908, a first edge 912 and a second edge 914. The first outer edge 903 is parallel to the first inner edge 906 and the second outer edge 904 is parallel to the second inner edge 908. Additionally, the fixers 910 of the adjuster 902 are on the first edge 912 and the second outer edge 904. The fixer 910, for instance, is a protrusion. Please note that the fixer of the present invention can be replaced by a recess, and the coupler of the present invention, by a protrusion.

Figure 9B:
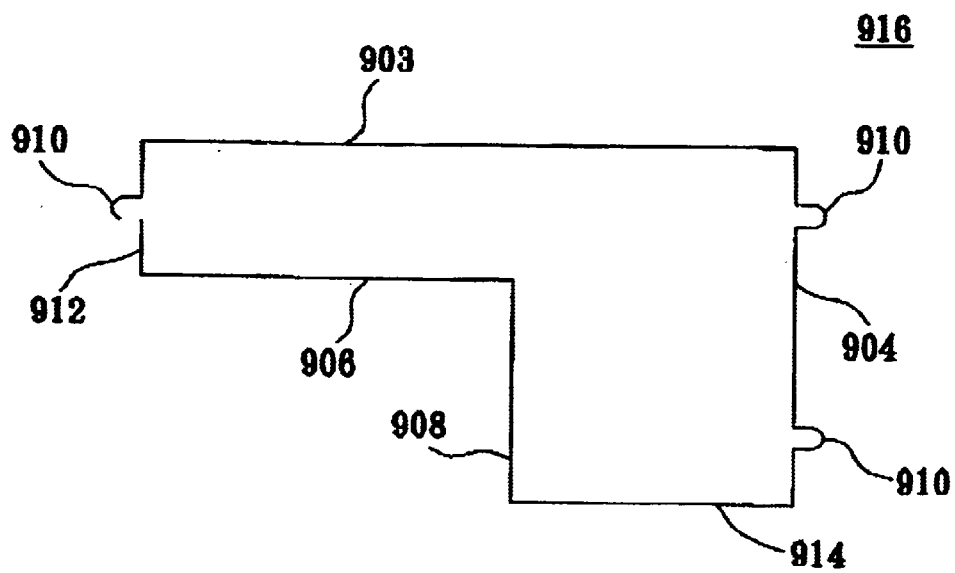
FIG. 9B shows the top view of the adjuster, according to the third embodiment of the present invention.

Referring to FIG. 9B, it shows the top view of the adjuster 916 according to the third embodiment of the present invention. Comparing the adjuster 916 in FIG. 9B and the adjuster 902 in FIG. 9A, both distances, from the first outer edge 903 to the first inner edge 906 and from the second outer edge 904 to the second inner edge 908, of FIG. 9B are larger than those respective distances of FIG. 9A.

Figure 10A:
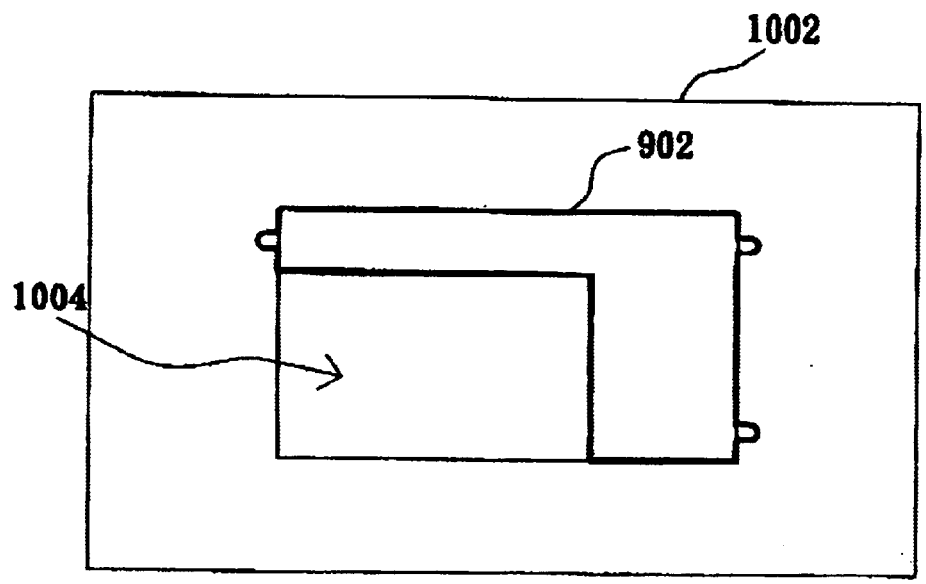
FIG. 10A shows the top view of the coupling relation of the adjuster and the loader, according to third embodiment of the present invention.

Referring to FIG. 10A, it shows the top view of the coupling relation of the adjuster 902 and the loader 1002 according to the third embodiment of the present invention. While the adjuster 902 is coupled to the loader 1002, the size of the loader window 1004 is determined by the distances from first outer edge 903 to the first inner edge 906 and from the second outer edge 904 to the second inner edge 908.

Figure 10B:
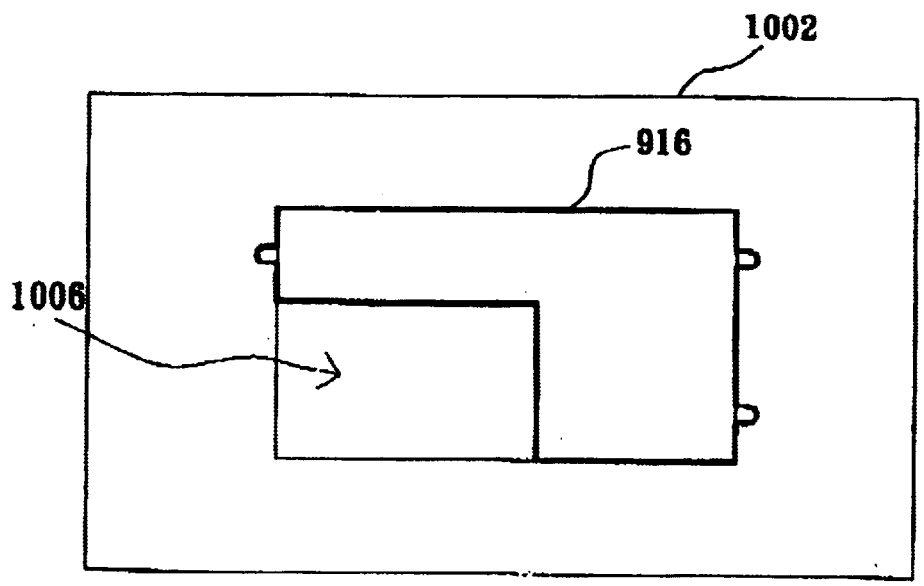
FIG. 10B illustrates the top view of another coupling relation of the adjuster and the loader, according to third embodiment of the present invention.

Referring to the FIG. 10B, it shows the top view of the coupling relation of the adjuster 916 and the loader 1002 according to third embodiment of the present invention. Because the distances from the first outer edge 903 to the first inner edge 906 and from the second outer edge 904 to the second inner edge 908 in FIG. 9B are larger than their respective distances in the FIG. 9A, the loader window 1006 in FIG. 10B is smaller than the loader window 1004 in FIG. 10A.

From the above description, various loader windows can be achieved by adjusting the size of the adjuster and the coupling method of the adjuster and the loader. Therefore, films of various scales can be fixed on the same film fix instrument. The user does not need to prepare several film fixing instruments, and thus, the user's cost is lowered.

Once given the above disclosure, many other features, modifications, and improvement will become apparent to the skilled artisan. Such other features, modifications, and improvements are, therefore, considered to be a part of this invention, and the scope of which is to be determined by the following claims.

What is claimed is:

1. A film fixing instrument for fixing films with different scales, said film fixing instrument comprising:
    a loader for loading a film, said loader having a loader window for transmitting light and having a plurality of couplers disposed around said window, said window being bounded by four adjoining sides, including a one side, an other side opposite to the one side, and two further sides opposite to each other and joining the one and the other sides;
    a removable and reversible adjuster having a surface for covering part of said window and having a plurality of fixers for coupling with said plurality of couplers, said adjuster selectively installed on, or removed from said loader to adjust said window;
    wherein said adjuster has an upper edge, a lower edge, a first side edge and a second side edge, said upper edge is opposite to said lower edge, said first side edge is opposite to said second side edge, said plurality of fixers are on said upper edge and said lower edge, and the distance of said first side edge to said plurality of fixers is larger than the distance of said second side edge to said plurality of fixers,
    wherein said adjuster is coupled with said loader by arranging said first side edge adjacent to the one side of said window, said second side edge intersects the two further sides of said window so that said second side edge, the two further sides of said window, and the other side of said window define a first light-transmissive area for allowing a film of a first scale to be fixed on said film fixing instrument,
    wherein when said adjuster is reversed and coupled with said loader by arranging said second side edge adjacent to the one side of said window, said first side edge intersects the two further sides of said window so that said first side edge, the two further sides of said window, and the other side of said window define a second light-transmissive area, different than said first light-transmissive area, for allowing a film of a second scale to be fixed on said film fixing instrument, and
    wherein when said adjuster is removed and not coupled with said loader, said four adjoining sides of said window define a third light-transmissive area, different than said first light-transmissive area or said second light-transmissive area, for allowing a film of a third scale to be fixed on said film fixing instrument.

2. The film fixing instrument of claim 1, wherein said plurality of fixers are recesses in said adjuster and said plurality of couplers are protrusions.

3. The film fixing instrument of claim 1, wherein said plurality of fixers are protrusions and said plurality of couplers are recesses in said loader.

4. The film fixing instrument of claim 1, further comprising a film clip for securing a film on said film fixing instrument.

5. The film fixing instrument of claim 1, wherein the surface of said adjuster is opaque.

6. A film fixing instrument for fixing films with different scales, said film fixing instrument comprising:
    a loader for loading a films, said loader having a loader window for transmitting light and having a plurality of couplers disposed around said window, said window being bounded by four adjoining sides, including a first two mutually adjoining sides and a second two mutually adjoining sides;
    a removable adjuster having a surface for covering part of said window and having a plurality of fixers for coupling with said plurality of couplers, said adjuster selectively installed on or removed from said loader to adjust said window,
    wherein said adjuster has an L shape and has a first outer edge, a second outer edge, a first inner edge and a second inner edge, the first outer edge being opposite to the first inner edge, the second outer edge being opposite to the second inner edge,
    wherein when said adjuster is coupled with said loader, said first outer edge and said second outer edge are adjacent to the first two adjoining sides of said window, each of said first inner edge and said second inner edge intersect a respective one of the second two mutually adjoining sides of said window so that said first inner edge, said second inner edge, and the second two mutually adjoining sides of said window define a one light-transmissive area for allowing a film of a scale to be fixed on said film fixing instrument; and
    wherein when said adjuster is removed and not coupled with said loader, said four adjoining sides of said window define another light-transmissive area, different than the one light-transmissive area, for allowing a film of another scale to be fixed on said film fixing instrument.

7. The film fixing instrument of claim 6, wherein said plurality of fixers are recesses in said adjuster and said plurality of couplers are protrusions.

8. The film fixing instrument of claim 6, wherein said plurality of fixers are protrusions and said plurality of couplers are recesses in said loader.

9. The film fixing instrument of claim 6, further comprising a film clip for securing a film on said film fixing instrument.

10. The film fixing instrument of claim 6, wherein the surface of said adjuster is opaque.

* * * * *